Sept. 11, 1956        A. BEUGLET        2,762,736

METHOD OF LINING TANKS

Filed May 20, 1952                           3 Sheets—Sheet 1

INVENTOR.
ANDRE BEUGLET
BY

Sept. 11, 1956

A. BEUGLET 2,762,736

METHOD OF LINING TANKS

Filed May 20, 1952

INVENTOR:
Andre Beuglet
BY:
Michael S. Striker
agt.

Sept. 11, 1956  A. BEUGLET  2,762,736
METHOD OF LINING TANKS

Filed May 20, 1952  3 Sheets-Sheet 3

INVENTOR:
Andre Beuglet
BY: Michael S. Striker
agt.

United States Patent Office 2,762,736
Patented Sept. 11, 1956

2,762,736

METHOD OF LINING TANKS

André Beuglet, Herisau, Switzerland

Application May 20, 1952, Serial No. 289,010

Claims priority, application Switzerland May 22, 1951

10 Claims. (Cl. 154—82)

Tanks intended for storing liquids have to be protected from corrosion through the latter, and the liquids have to be protected from any detrimental action thereon from the part of the tank. This especially holds true for the case of metallic tanks and containers.

Up to the present, such protection has been attained by enameling the tank inside. Of late, tanks have been lined by plastics. For such purpose the inside had to be ground or roughened by sandblasting prior to the application of the lining so as to obtain the basis for a good bond of the plastic to be sprayed on. Sandblasting, however, calls for an intensive airing with the aid of special ventilating plants during the treatment. Such sandblasting often requires that the tank be dismounted and removed, since such treatment not always may be carried out in the tank storage rooms.

The object of my present invention is to eliminate the said disadvantages and to provide a robust and resistant lining which, as required, may be odorless, tasteless or resistant to chemicals.

The method disclosed herein comprises the steps of lining the tank inside walls with closely abutting plates of plastic and elastic material, providing intercommunicating hollow spaces between the said walls and the plates resting thereon, sealingly interconnecting adjacent plates, and pressing down the entire lining to the said walls by means of a vacuum produced in the said hollow spaces.

The method according to my present invention may be carried out as follows:

The plates which consist of plastic, elastic material—such as thermoplastic materials, natural or synthetic rubber and the like—are prefabricated in suitable width. The plate rearside, i. e. that side which comes to rest on the tank inside walls, comprises intercommunicating hollow spaces. The said side, for example, is provided with a profile comprising grooves of such depth as to leave the plate sufficiently thick so that the mechanical strength of the lining is not impaired under the pressure of the atmosphere and of the liquid contents. The plates then are brought into annular shape, closely superposed on the tank inside wall and interconnected by welding. Cocks, inlets, outlets and openings are sealed in known manner, such as is done for example when mounting fittings used on glass-enamel tanks and the like. The tank end walls are covered by plates of the same plastic material and connected to the annular plates so that the entire interior lining consists of elastical plastic material. When using thermoplastic masses, the plates are suitably interconnected by welding in known manner.

As spacing means in place of the profiles provided in the plate rearsides, which form hollow spaces, the latter could be formed by interposing a wire net between tank inside wall and plates or by disposing corresponding hollow spaces in the tank inside wall.

In both these cases, the plate rearside may be smooth, i. e. have no profile.

At the deepest point of the tank a bore is provided and an outside union mounted thereon so as to establish communication between the space intermediate of the lining and the tank and the outside atmosphere.

By applying pressure inside the tank, the lining is pressed down on to the tank inside wall and clings tightly thereto. The said union is connected to a source of vacuum, and the air present in the intercommunicating hollow spaces of the lining is sucked off. The lining thereby is firmly located on the tank inside wall and adheres thereto under the action of the atmospheric pressure in the tank inside, irrespective of whether the tank is full or empty.

Firm adherence of the lining to the tank wall will be maintained as long as the intercommunicating hollow spaces between the lining and the tank wall are kept under relative vacuum i. e. are kept under lower pressure than the pressure exerted by the atmosphere on the surface of the lining facing the inside of the tank.

After having evacuated the hollow spaces, the said union is hermetically closed, a measuring instrument being incorporated for testing the pressure conditions. Furthermore, a transparent piece of pipe, for example made of plastic material, is mounted on the said union. Should the lining become leaky, liquid will accumulate in the said piece of pipe, since the union is disposed at the deepest point of the tank, and thereby the air-tightness of the lining may be continuously checked in a simple manner. The transparent piece of pipe may consist of thermoplastic material and serve as closure for the union. In such case, the said piece of pipe may be used as vacuum closure means.

The method described has many advantages. First, the tank or container may be lined in situ; the tank does not have to be dismounted and carried away. Second, the inside wall does not have to be sandblasted, and, therefore, no troubles arise through impurities in the storage room.

Since no adhesives nor solvents are required, there is no danger of impairing the taste of the liquid stored in the tank. The lining is free of pores and, thus, may be used for various kinds of goods without any after effects from the part of the goods previously stored in the tank. When applying the method disclosed by my present invention, the tank is not altered in any way and does not require any treatment, except for repairs at defective points.

The tightness of the lining may be checked at any and all times.

It further is to be noted that today many kinds of plastic materials are available which may be acidproof, alkaliproof or alcoholproof. Such fact affords the opportunity of using a tank, lined by the method disclosed herein, for materials containing acids, alkalis or alcohols, even when the original tank did not satisfy such requirements. The lining may be applied to tanks made of any kind of material, such as iron, aluminium or concrete, above all, however, to tanks having a defective glass-enamel coating.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
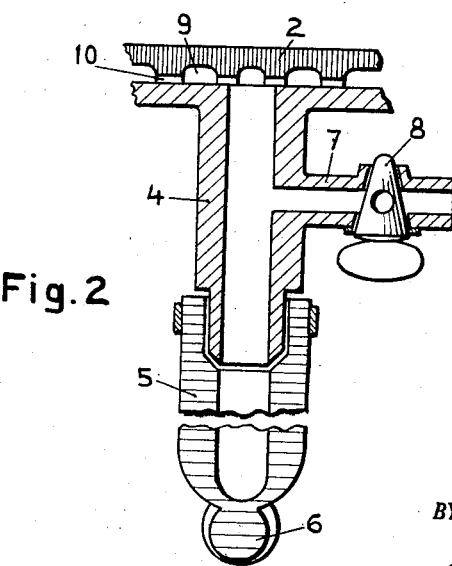
Fig. 2 is a detailed view of the portion of the container in the vicinity of the outlet means through which air is evacuated.

In the drawings, there is shown a tank container 1 having a lining wall 2, which is formed of sealed abutting plate members each provided with a profiled rear surface, as more clearly shown in Fig. 2. At the bottom of the container an outlet nozzle 3 is provided which has a metallic tubular portion 4 comunicating with the intervening space between lining 2 and the tank wall, and having a branch pipe 7 provided with a cock 8 for closing off tube 7. Tube 7 may be connected to a vacuum pump (not shown) by means of which the air in the intervening space between lining wall 2 and tank wall may be evacuated. The formation of the profile on the rear surface of lining wall 2, as clearly shown in Fig. 2, includes recesses 9 which are interconnected by passages 10, the recesses 9 and passages 10 forming an intervening space between lining wall 2 and the interior surface of the tank.

Sealed together with tube 4 is a transparent plastic nipple 5, the end 6 of which is fused together and sealed, to serve as a transparent inspection vessel.

Figure 1:
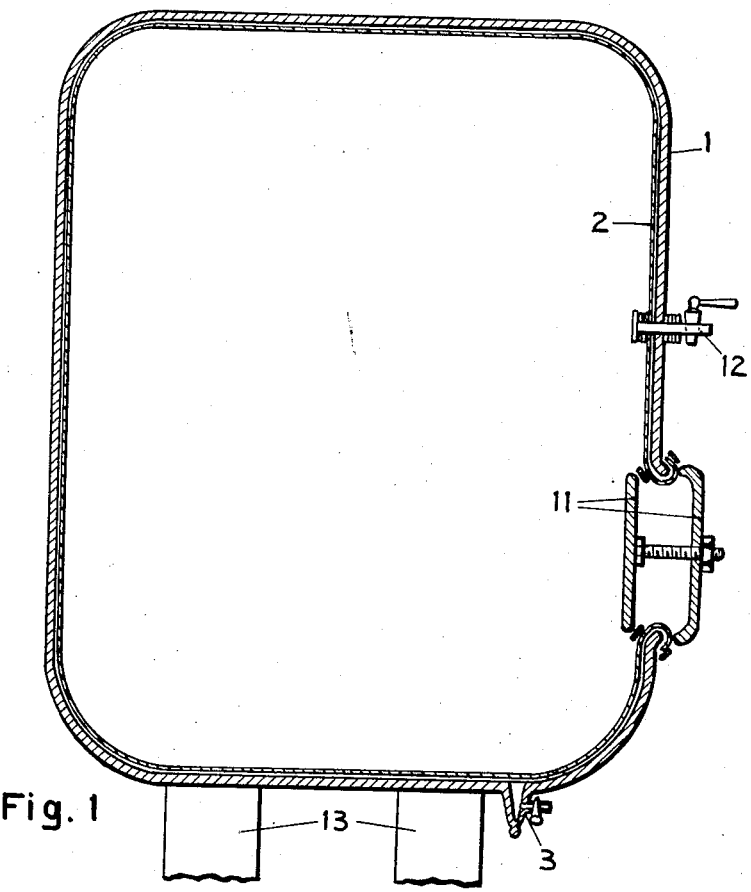
Fig. 1 shows a cross section through a container having the lining arranged therein in accordance with the present invention.

As shown in Fig. 1, the tank container is provided with a manhole cover device 11 for covering the main opening in the tank, and an outlet valve 12 is also provided in communication with the interior of the tank. A concrete foundation 13 is provided for supporting the tank.

Figure 3:
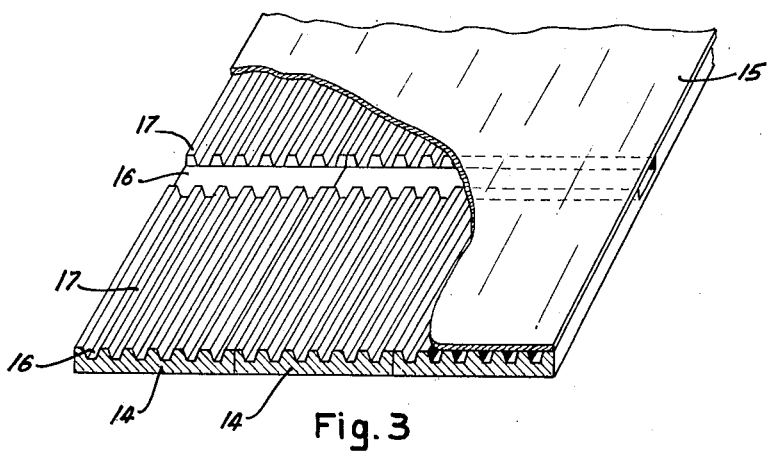
Fig. 3 shows a perspective view of a plurality of abutting plastic plates adhering to the tank wall (partly cut away)

As shown in Fig. 3, plastic plates 14 are positioned closely adhering to each other so as to form a continuous surface opposite tank wall 15. The surface of the plastic plates 14 facing tank wall 15 is provided with a plurality of projecting ridge portions 17 separated by intercommunicating hollow spaces or grooves 16 so that upon evacuation of air from any part of the intercommunicating hollow spaces all of the intercommunicating hollow spaces will be evacuated.

Figure 4:
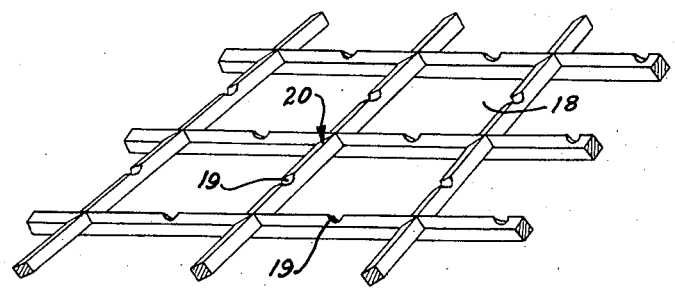
Fig. 4 shows a perspective view of a wire netting in accordance with the present invention.

Fig. 4 shows a portion of a wire netting 20 provided for spacing a lining wall from the interior surface of a tank. This wire netting together with the interior surface of the tank and one surface of the lining wall forms a plurality of hollow spaces 18. The hollow spaces comunicate with each other through indentations 19 formed in the wire netting so that the whole intercommunicating hollow space can again be evacuated from any part thereof.

Figure 5:
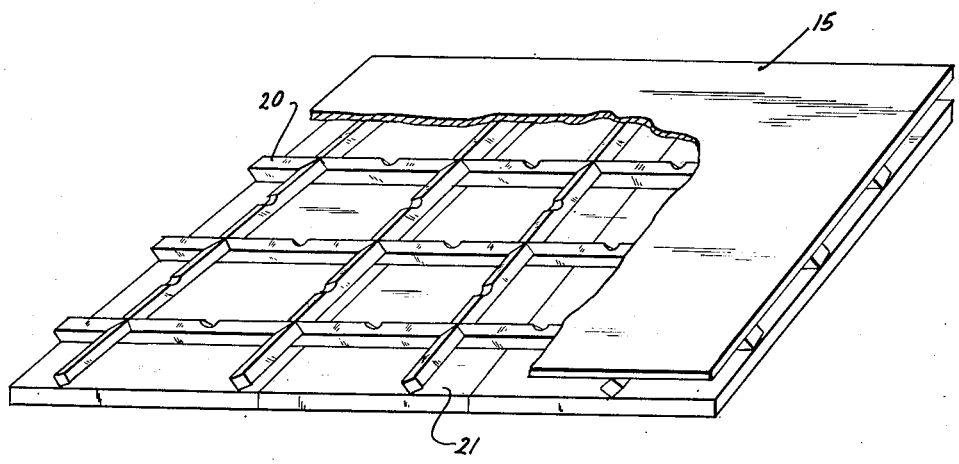
Fig. 5 shows a perspective view of a plurality of abutting plastic plates being spaced from the tank wall (partly cut away) by a wire netting.

As shown in Fig. 5, flat plastic plates 21 are positioned closely adhering to each other so as to form a continuous surface opposite tank wall 15. A wire netting 20 such as shown in Fig. 4 is interposed between flat plastic plates 21 and tank wall 15. An intercommunicating hollow space is thus formed between the tank wall 15 and abutting flat plastic plates 21 so that upon evacuation of air from any part of the intercommunicating hollow space all of the intercommunicating hollow space will be evacuated.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of lining hollow containers, comprising the steps of arranging along the interior surface of a hollow container a lining wall means including a lining wall and spacing means between said lining wall and said interior surface of said hollow container so as to space said lining wall from said interior surface and provide an intervening space between said lining wall and said interior surface; evacuating the air in said intervening space while said spacing means prevents said lining wall from moving towards said interior surface of said hollow container; and sealing said lining wall, thus preventing fluid from entering into said evacuated intervening space.

2. The method of lining hollow containers, comprising the steps of arranging a lining wall along the interior surface of a hollow container, one surface of the lining wall facing the container interior surface, said lining wall having portions extending outwardly from said one surface of said lining wall towards said interior surface of said hollow container so as to provide an intervening space formed with intercommunicating hollow spaces between said lining wall and said interior surface; evacuating the air in said intervening space while said outwardly extending portions prevent said lining wall from moving towards said interior surface of said hollow container; and sealing said lining wall, thus preventing fluid from entering into said evacuated intervening space.

3. The method of lining hollow containers, comprising the steps of arranging along the interior surface of a hollow container a lining wall means including a lining wall comprising a plurality of abutting sheet members and spacing means between said lining wall and said interior surface of said hollow container so as to space said lining wall from said interior surface and provide an intervening continuous space between said lining wall and said interior surface; sealing adjacent ones of said abutting sheet members together, evacuating the air in said intervening space while said spacing means prevents said lining wall from moving towards said interior surface of said hollow container; and sealing said lining wall, thus preventing fluid from entering into said evacuated intervening space.

4. The method of lining hollow containers, comprising the steps of arranging a lining wall comprising a plurality of abutting sheet members along the interior surface of a hollow container, one surface of each of said sheet members forming the lining wall facing the container interior surface being provided with intercommunicating hollow spaces so as to provide an intervening space between said lining wall and said interior surface; sealing adjacent ones of said abutting sheet members together; and evacuating the air in said intervening space while maintaining said intercommunicating hollow spaces so that the position of said lining wall relative to the interior surface of said hollow container remains unchanged; and sealing said lining wall, thus preventing fluid from entering into said evacuated intervening space.

5. The method of lining hollow containers, comprising the steps of arranging a lining wall along the interior surface of a hollow container, one surface of the lining wall facing the container interior surface, said lining wall having portions extending outwardly from said one surface of said lining wall towards said interior surface of said hollow container so as to provide an intervening space formed with intercommunicating recesses between said lining wall and said interior surface; evacuating the air in said intervening space while said outwardly extending portions prevent said lining wall from moving towards said interior surface of said hollow container; and sealing said lining wall, thus preventing fluid from entering into said evacuated intervening space.

6. The method of lining hollow containers, comprising the steps of arranging a lining wall along the interior surface of a hollow container spaced therefrom by a wire netting so as to provide an intervening space between said lining wall and said interior surface; evacuating the air in said intervening space while said wire netting prevents said lining wall from moving towards said interior surface of said hollow container; and sealing said lining wall, thus preventing fluid from entering into said evacuated intervening space.

7. The method of lining hollow containers, comprising the steps of arranging along the interior surface of a hollow container a lining wall means including a lining wall and spacing means between said lining wall and said interior surface of said hollow container so as to space said lining wall from said interior surface and provide an intervening space between said lining wall and said interior surface; evacuating the air in said intervening space while said spacing means prevents said lining wall from moving towards said interior surface of said hollow container; sealing said lining wall at said outlet means, thus preventing fluid from entering into said evacuated intervening space; and visibly determining through a transparent wall portion communicating with said evacuated space whether there is any leakage through said lining wall into said intervening space.

8. The method of lining hollow containers, comprising the steps of arranging a lining wall comprising a plurality of abutting plastic elastic plate members along the interior surface of a hollow container, one surface of each of said plastic elastic plate members forming the lining wall facing the container interior surface being provided with intercommunicating hollow spaces so as to provide an intervening space between said lining wall and said interior surface; sealing adjacent ones of said abutting plate members together; evacuating the air in said intervening space while maintaining said intercommunicating hollow spaces so that the position of said lining wall relative to the interior surface of said hollow container remains unchanged; and sealing said lining wall, thus preventing fluid from entering into said evacuated intervening space.

9. The method of lining hollow containers, comprising the steps of arranging a lining wall comprising a plurality of abutting synthetic plastic plate members along the interior surface of a hollow container, the surface of each of said plate members forming the lining wall facing the container interior surface being provided with intercommunicating hollow spaces so as to provide an intervening space between said lining wall and said interior surface; sealing adjacent ones of said abutting plate members together; evacuating the air in said intervening space so that said lining wall adheres to the interior surface of said hollow container; and sealing said lining wall, thus preventing fluid from entering into said evacuated intervening space.

10. The method of lining hollow containers, comprising the steps of arranging a lining wall comprising a plurality of abutting rubber plate members along the interior surface of a hollow container, one surface of each of said plate members forming the lining wall facing the container interior surface being provided with intercommunicating hollow spaces so as to provide an intervening space between said lining wall and said interior surface; sealing adjacent ones of said abutting plate members together; evacuating the air in said intervening space while maintaining said intercommunicating hollow spaces so that the position of said lining wall relative to the interior surface of said hollow container remains unchanged; and sealing said lining wall, thus preventing fluid from entering into said evacuated intervening space.

References Cited in the file of this patent

UNITED STATES PATENTS

| 1,540,563 | Oliver | June 2, 1925 |
| 2,088,922 | Porteous | Aug. 3, 1937 |
| 2,113,728 | Harrison | Apr. 12, 1938 |
| 2,346,423 | Gray | Apr. 11, 1944 |
| 2,516,242 | Munger | July 25, 1950 |